(12) United States Patent
Ashworth (10) Patent No.: US 11,468,382 B2
(45) Date of Patent: Oct. 11, 2022

(54) MULTINODE DISTRIBUTED INTEGRITY OF PRODUCING FILES

(71) Applicant: NEOPOST TECHNOLOGIES, Bagneux (FR)

(72) Inventor: Peter Ashworth, London (GB)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 942 days.

(21) Appl. No.: 14/955,815

(22) Filed: Dec. 1, 2015

(65) Prior Publication Data

US 2016/0155071 A1   Jun. 2, 2016

(30) Foreign Application Priority Data

Dec. 2, 2014   (EP) .................................. 14306940

(51) Int. Cl.
| | |
|---|---|
| *G06Q 10/06* | (2012.01) |
| *G06F 16/16* | (2019.01) |
| *B43M 3/04* | (2006.01) |
| *G07B 17/00* | (2006.01) |

(Continued)

(52) U.S. Cl.
CPC ........... *G06Q 10/0633* (2013.01); *B43M 3/04* (2013.01); *G06F 16/16* (2019.01); *G06F 16/183* (2019.01); *G07B 17/00435* (2013.01); *G06Q 50/32* (2013.01); *G07B 2017/00048* (2013.01); *G07B 2017/00443* (2013.01); *G07B 2017/00491* (2013.01); *G07B 2017/00709* (2013.01)

(58) Field of Classification Search
CPC .... G06Q 10/0633; G06Q 50/32; G06F 16/16; G06F 16/183; G07B 2017/00709; G07B 17/00467; G07B 2017/00475; G07B 2017/00483; G07B 2017/00491; G07B 2017/00443; G07B 2017/00048; G07B 17/00435; B43M 3/04
USPC ....................................................... 705/7.27
See application file for complete search history.

(56) References Cited

U.S. PATENT DOCUMENTS 5,072,400 A * 12/1991 Manduley ................. B07C 1/00
                                                                 177/4
5,179,660 A *  1/1993 Devany ............. G06F 17/30566
                                                              707/999.01

(Continued)

OTHER PUBLICATIONS

Improvement of Postal Mail Sorting; Djamel Gaceb et al; 2008 (Year: 2008).*

(Continued)

*Primary Examiner* — Timothy Padot
*Assistant Examiner* — Francis Z. Santiago Merced
(74) *Attorney, Agent, or Firm* — Cozen O'Connor (57) ABSTRACT

A system of producing files containing information about printed mailpieces comprising a plurality of folder inserters (22, 24, 26) each having a reading device for extracting at least a job ID and a mailpiece ID, the system comprising at least:
a processing node (32, 34, 36) adapted to check the job ID and mailpiece ID from the printed mailpiece and to check out a relevant job against locally held rules;

(Continued)

a storage node (38) connected to the processing node and adapted to store the job ID and mailpiece ID sent by the processing node; and an interface node (40) connected to the storage node and adapted to import and export the files.

14 Claims, 6 Drawing Sheets

(51) Int. Cl.
  *G06Q 50/32* (2012.01)
  *G06F 16/182* (2019.01)

(56) References Cited

U.S. PATENT DOCUMENTS

| | | | | |
|---|---|---|---|---|
| 6,026,385 | A * | 2/2000 | Harvey | G07B 17/00024 |
| | | | | 705/401 |
| 6,370,521 | B1 * | 4/2002 | Pigos, Jr. | G06Q 10/107 |
| 6,988,349 | B2 * | 1/2006 | Woodman | G06F 3/1206 |
| | | | | 53/474 |
| 7,403,926 | B2 * | 7/2008 | Herbert | G07B 17/00314 |
| | | | | 705/410 |
| 7,451,014 | B2 * | 11/2008 | Welch | G07B 17/00467 |
| | | | | 270/58.06 |
| 8,285,651 | B1 * | 10/2012 | Leon | G07B 17/00733 |
| | | | | 705/330 |
| 8,406,248 | B2 * | 3/2013 | Pratt, Jr. | G01D 21/00 |
| | | | | 370/444 |
| 2002/0087493 | A1 * | 7/2002 | Herbert | G07B 17/00314 |
| | | | | 705/406 |
| 2003/0200113 | A1 * | 10/2003 | Latta | G07B 17/00024 |
| | | | | 705/401 |
| 2005/0031162 | A1 * | 2/2005 | Sagi | G06Q 10/10 |
| | | | | 382/101 |
| 2007/0050317 | A1 * | 3/2007 | McNairy | G07B 17/00661 |
| | | | | 705/410 |
| 2008/0161966 | A1 * | 7/2008 | Sharma | G07B 17/00467 |
| | | | | 700/219 |
| 2009/0010205 | A1 * | 1/2009 | Pratt, Jr. | G01D 21/00 |
| | | | | 370/328 |
| 2010/0106282 | A1 * | 4/2010 | Mackelprang | G06Q 10/06 |
| | | | | 700/115 |
| 2012/0317056 | A1 * | 12/2012 | Leon | G07B 17/00733 |
| | | | | 705/404 |
| 2014/0067725 | A1 * | 3/2014 | Leon | G07B 17/00733 |
| | | | | 705/407 |

OTHER PUBLICATIONS

European Search Report, EP Application No. 14306940, dated May 27, 2015, 2 pages.

* cited by examiner

MULTINODE DISTRIBUTED INTEGRITY OF PRODUCING FILES

BACKGROUND

Technical Field

The present application relates to mail processing, and in particular to improvements in mail production systems incorporating paper handling machines used for inserting documents and inserts into envelopes.

Description of the Related Art

Management systems within the print and mailing industries often use the terminology of closed loop and open loop to describe their integrity features.

In a closed loop system, print production software prints a job of mailpieces and produces a file that contains information about each mailpiece that has been printed (e.g., finishing instructions). This file is loaded into integrity software and the mailpieces are run through the folder inserter. As mailpieces enter a machine, they are checked against the integrity software and as mailpieces exit a machine, the mailpieces that end up where they are intended (e.g., in an envelope or commanded divert) are marked as good and other mailpieces are marked as bad. This information is sent back to the production software in the form of another file. The production software uses this returned information to determine which mailpieces need printing again. This loop can be repeated as many times as required to ensure all mailpieces end up where they are intended.

In an open loop system, print production software prints a job of mailpieces but either does not produce a file for integrity checking, or does not receive back a file showing mailpieces that are complete or mailpieces that require reprinting. Finishing instructions are often printed directly on each mailpiece in, e.g., an OMR form that can be interpreted by the inserter.

Closed loop systems typically require near real-time communications between the equipment performing the work and the computer systems managing the processes. This can cause problems during implementation as, commonly, dedicated local computer networks are required. This adds to the expense and can complicate integration processes. These problems are exacerbated if a single close loop system is required to operate across multiple locations. Closed loop systems have in the past been reliant on the speed of this near real-time communication, with network traffic, distance, and network communication latency having the effect of slowing down equipment or causing it to stop working altogether.

Open loop systems have the inherent disadvantage of not providing integrity to the print and mail process in that the mailpiece is not tracked through the process and the marking of mailpieces as good or bad, and therefore requiring of reprint, is down to the operator on duty at the time.

U.S. Pat. No. 5,072,400 describes a system for monitoring the integrity of mailpieces passing through multiple stages of a mail delivery system. A database is created when the mailpiece enters the system that includes its initial weight and destination address. The mailpiece is tracked through each of the delivery stages, where its weight and destination address are determined and compared with the initial values. Any discrepancy causes an alarm in the system.

Similarly, U.S. Pat. No. 6,370,521 describes an integrated computer system architecture for tracking of job data in a document processing environment including an infrastructure built on processes, hardware, software and interfaces designed to monitor and control mail processing and data collection through a variety of manual and machine processes in real-time. Computers, networks, web-based applications, databases and scanners are used to interface and integrate traditional mail processing equipment with customized software. The invention in that patent integrates the entire mail production process to form and establish a complete end-to-end system. A job tracking scheme is detailed illustrating a particular data mining application.

Likely, U.S. Pat. No. 6,988,349 relates to generating a printstream in a computer that is preferably remote from the one or more inserter systems. Once generated, the printstream is transmitted preferably to a high speed, high volume, printer for producing the printed documents to be included in the mail pieces, such as billing statements. The printed documents are then delivered to the one or more inserter systems, which are to be used as the input sheets in the one or more inserter systems. The print stream is also provided to a workstation computer coupled to the one or more inserter systems. This workstation interpolates the printstream in order to generate a reprint database containing electronic files corresponding to each of the printed documents. Also coupled to the workstation is a local printer, which may be used to generate documents, for re-processing purposes, from data received from the reprint database. The work station also interpolates the printstream in order to generate a job tracking database, which database contains the job level data for the mail pieces that are to be assembled in the one or more inserter systems.

Though this MRDF processing method (Mail Run Data File) proves satisfactory for controlling multiple inserter systems running a single mail run without modification to a mailer's mainframe computer, it does not allow for the use of a closed loop solution to be used in a multi-site situation. Specifically there is a requirement of extracting data for the MRDF directly from the print stream and providing a workstation coupled to the folder inserter.

Closed loop concepts are also discussed within U.S. Pat. No. 7,451,014 where a mailpiece inserter system is provided including a User PC or computer, a mailpiece inserter and a client server which are network connected to share information and data concerning mail run data. The user computer is operative to receive operator input in connection with mail run data and produce mailpiece content material having assembly code information. The mailpiece inserter is operative to receive the mailpiece content material and assemble the mailpiece content material in combination with envelops to form a plurality of mailpieces. The client server is operative to receive the mail run data for storing and tracking information concerning the assembly of each mailpiece. The communication network may be disabled in an open loop control mode to facilitate rapid mailpiece processing and enabled in a closed loop control mode to facilitate tracking, reconciliation and security of mailpiece assembly. The mailpiece inserter includes an inserter control system operative to read and interpret assembly code information directly from the mailpiece content material in the open loop control mode. The client server includes a control system engine operative to receive the assembly code information from the user computer and bi-directionally communicate with the inserter control system of the mailpiece inserter. The bidirectional communication facilitates processing and assembly tracking of the mailpieces in the closed loop control mode.

However closed loop concepts discussed in U.S. Pat. No. 7,451,014 suffer from a major limitation in that they require a real-time communication between the folder inserter and the server using a client server relationship. The requirement is said to result in a sacrifice in processing speed. The result is that the implementation requires a dedicated network and cannot be used across any great distance or in a multi-site scenario.

BRIEF SUMMARY

Various embodiments are directed to a mail production system which still better optimizes both handling of mailpieces and monitoring of the integrity of processed mailpieces in particular within a vast multi-site environment.

Such may include minimizing the communication issues (speed, flow) between the machines and the network.

According to a first aspect, this is achieved through the provision of a mail production system of the type producing files containing information about printed mailpieces comprising a plurality of folder inserters each having a reading device for extracting at least a job ID and a mailpiece ID, wherein for processing said printed mailpieces through said plurality of folder inserters the system comprises at least:
- a processing node adapted to check said job ID and mailpiece ID from the printed mailpiece and to check out a relevant job against locally held rules;
- a storage node connected to said processing node and adapted to store said job ID and mailpiece ID sent by the processing node; and
- an interface node connected to said storage node and adapted to import and export said files.

According to another aspect, communications between the at least one folder inserter and the processing node occur in real-time.

Nodes are thus distributed across the network making them local to the work that they are performing. Processing nodes are therefore close to the equipment, Storage nodes are close to the permanent storage, and Interface nodes are close to the files that go in and out of the closed loop system. Near real-time communication is maintained within the functions of the machine and processing node; however communication between the nodes is allowed to occur at a slower speed. The effect is equipment that can run at full capability irrespective of the communication issues of the underlying communication network. The technical issue constituted by the limitation of slow or congested network links between the folder inserter and the server is therefore solved. With the current solution, the folder inserter will be slowed down if the network slows down, however with the new proposal this is no longer be the case and the folder inserter can run at full production speeds. This is done by moving the task of controlling and monitoring the folder inserter from the remote server to a computer that is local to the folder inserter. This controlling and monitoring can then continue to occur in real-time, with the reporting and storing of this data back to the remote server occurring at a slower speed dependent on the speed of the network connection to the remote server.

According to more another aspect, communications between said processing node, said storage node and said interface node use a local protocol or a network protocol and the communications between nodes are serialized within a message object having a transaction ID and where said communications do not need to be in real-time.

According to still another aspect, each folder inserter has a processing node, the processing nodes of the folder inserters that do not checked out the job relay said job ID and mailpiece ID to the processor node that has checked out the job and it preferably comprises a single processing node and all the folder inserters share said single processor node.

Preferably, the at least one folder inserter is allocated to a plurality of production sites.

BRIEF DESCRIPTION OF THE SEVERAL VIEWS OF THE DRAWINGS

The embodiments of invention can be better understood in reading the following detailed description accompanied by illustrative and non-limiting examples with reference to the drawings, in which.

DETAILED DESCRIPTION

Figure 1:
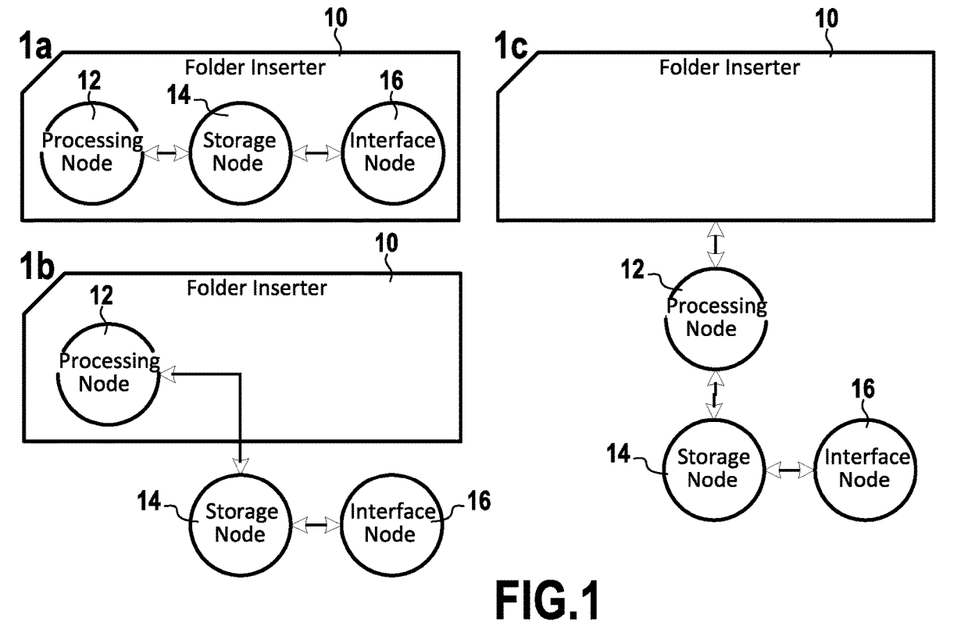
FIG. 1 represents three schematic drawings of a mail production system showing different locations of nodes according to an embodiment the invention.

FIG. 1 shows three examples as to where nodes can be located within a mail production system according to at least one embodiment of the present invention. It should be noted that these are examples and should not be seen as limiting. In (1a), a folder inserter 10 includes three nodes; a processing node 12, a storage node 14 and an interface node 16 connected together, all of the nodes being located on the folder inserter itself. In (1b), the processing node 12 is located on the folder inserter but the storage node 14 and the interface node 16 are located elsewhere. In (1c), the folder inserter communicates with the processing node 12 which is located elsewhere. The storage node 14 and interface node 16 are also located outside of the folder inserter 10.

Figure 2:
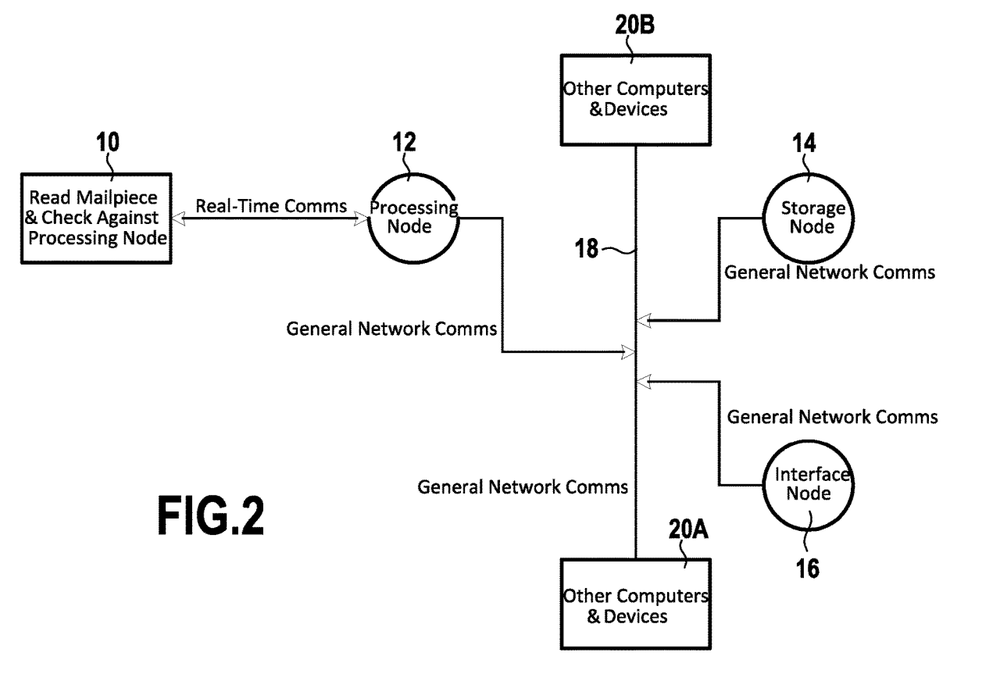
FIG. 2 is a simplified diagram of the communication network pertaining to the mail production system of FIG. 1.

In all three of these examples, the communication between the folder inserter actions and the processing node are in real-time but the communications between the processing node and other nodes are not limited by any requirement for real-time communications. More particularly, FIG. 2 shows that communication within the folder inserter 10 and processing node 12 are in real-time however communication between the processing node 12 and the other nodes 14, 16 can be carried out using general network communications and that the network 18 used between these other nodes can be shared with other computers and devices 20, 22.

When data is sent between the nodes it will be serialized within a message object. The message object shall have an attachment property that can be either a job object or a mailpiece object. The attached object shall be assigned a "Transaction Id" to ensure no transactions are lost between the Nodes. If a transaction instigated at one node does not receive a reply with the same "Transaction Id" it will error and a new message object shall be sent with the original attachment and original "Transaction Id". If the transaction was applied correctly at the destination this repeated send will not be applied again, but a reply with the "Transaction Id" will be sent to the sender to ensure it knows that the transaction was successful.

If the network fails between the nodes, the folder inserter shall still be able to work with its local node. This local node will attempt to reconnect the network every few seconds and, once successful, it will apply the changes to the storage node.

The processing of mailpieces operates as follows. Job and mailpiece data are transferred from print management software to the closed loop system using the interface node. This data is then stored in permanent storage using the storage node. Separately physical mailpieces are printed and fed into a folder inserter. On entering the folder inserter, a barcode on the prime document is read and a job Id is extracted. This job Id is used by the processing node to attempt to check out the job from the storage node. It is successful and a basic listing of mailpiece information is checked out to the processing node. Mailpieces are allowed to process through the folder inserter, with integrity checks for duplicates and identifiers that do not exist in the listings be carried out locally in the processing node. As mailpieces enter and exit the folder inserter, transactions are written to a queue in the processing node. The queue is regularly interrogated and transactions are sent to the storage node for writing to the permanent storage. Once all mailpieces have been processed, or the folder inserter is auto ended, the job is checked back into the storage node.

Figure 3A:
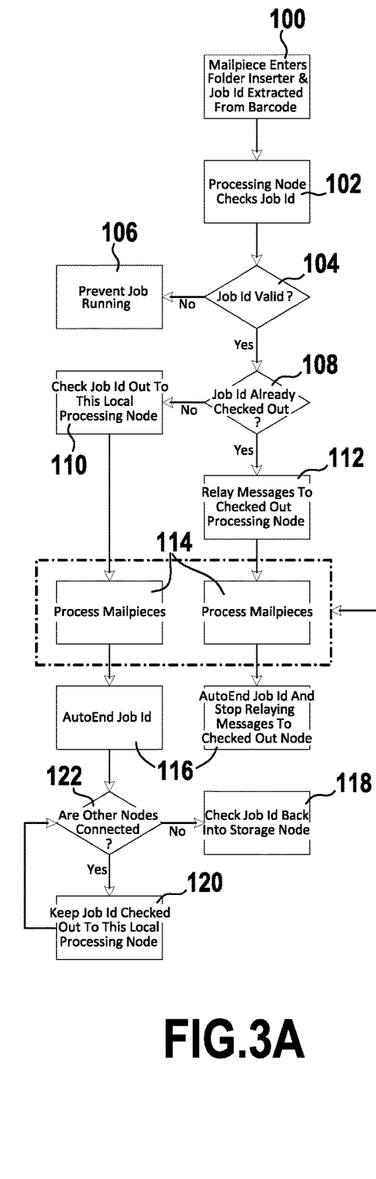
FIG. 3A and FIG. 3B refers to the functional diagram of the mail production system of FIG. 1 detailing the respective processes involved in checking out and in jobs, and processing mailpieces.

FIG. 3A shows with details this processes involved in checking out a job to the local processing node 12. In step 100 the process is started with the presentation of the first page of a mailpiece at the input of a folder inserter. At this point, a label of some type, perhaps a barcode, 2D data matrix, or OCR, is read by a scanner or camera system and the job Id is extracted. The job Id is checked by the local processing node in step 102 to ensure it is a job Id that is recognized by the integrity system. These checks are performed locally at the processing node and with requests to the storage node. If the job Id is not recognized by the integrity system (test of step 104), then the job is prevented from running as shown in step 106. If the job Id is recognized, then a decision is then made (test of step 108) whether to check the job out to the local processing node (step 110) or relay messages to the processing node that has the job checked out to it (step 112).

Figure 3B:
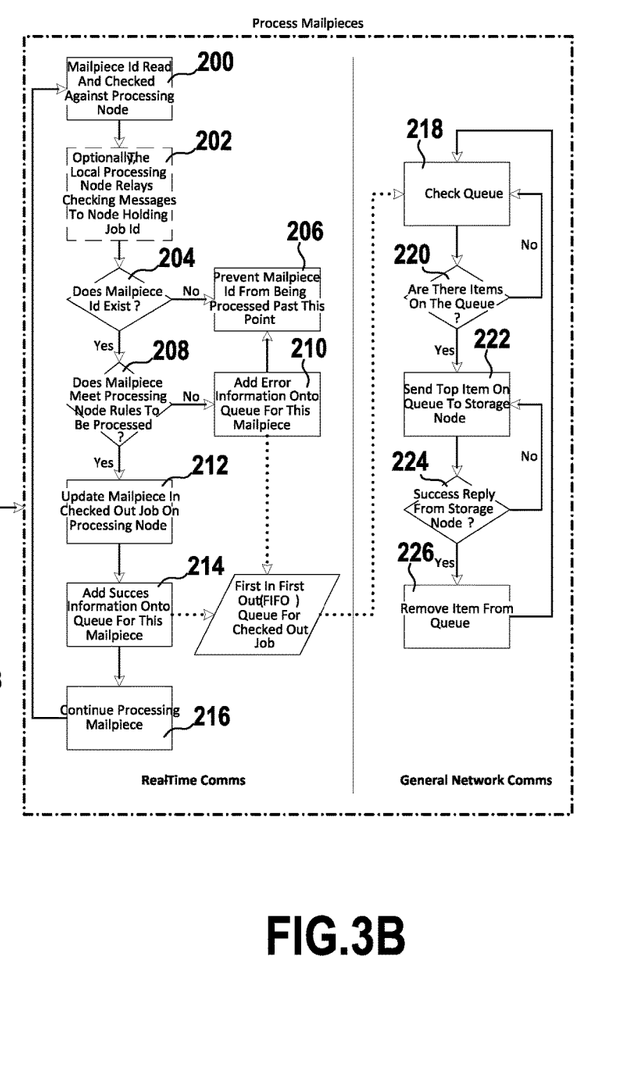

Mailpieces are then allowed to be processed in step 114 with each mailpiece being checked as detailed in FIG. 3B. Once the folder inserter has finished processing mailpieces (step 116), the job is checked back into the storage node as shown in step 118. However, this process can be delayed in step 120 if there are other folder inserters relaying messages to the local processing node as shown by test step 122.

FIG. 3B shows the processes involved in maintaining the integrity of mailpiece information on the local processing node 12, the storage node 14, and in-between. In step 200, a mailpiece has its mailpiece Id read in some way, for example through use of a scanner or camera system reading a barcode, 2D data matrix, or OCR. The local processing node checks this mailpiece Id against the job currently held in the local processing node. Optionally, in step 202, the local processing node forwards this checking task and other tasks affecting this job to another processing node if the other processing node has the job checked out to it.

The existence of the mailpiece Id within the job is then checked (test of step 204) and if the mailpiece Id does not exist in the job, then the mailpiece is prevented, as seen in step 206, from being progressed any further in the folder inserter. On the contrary, if the mailpiece Id does exist in the job held on the appropriate processing node, then rules regarding the allowed processing of the mailpiece, such as whether the mailpiece has already been seen (indicating a duplicate mailpiece), are checked (test of step 208). If the mailpiece fails these rules then error information is added onto the First In, First Out (FIFO) queue regarding this mailpiece as shown in step 210 and this mailpiece is then prevented from progressing any further in the folder inserter (return to step 206). If the mailpiece successfully passes the rules then the mailpiece information, including its disposition and any output data, is updated on the local processing node, as shown in step 212, and the success information is added onto the FIFO queue as shown in step 214.

The processing of mailpiece continues in step 216 and meanwhile the FIFO queue is being regularly checked to see if there are any items on the queue that can be sent to the storage node. Step 218 shows the FIFO queue being checked. If there are no items in the FIFO queue (test of step 220) then the process loops around and the FIFO queue is checked again. A delay can be added in the loop to prevent overworking of either the CPU or network. If there are items on the FIFO queue then the item at the top of the FIFO queue is sent to the storage node as shown in step 222. When an item from the FIFO queue is sent to the storage node, it is allocated a unique message identifier and it is not at this time removed from the FIFO queue. No other items from the FIFO queue will be sent to the storage node until the storage node has responded showing the successful receipt of the initially sent item. This response must include the unique message identifier. If there is not a successful response then the same item will be sent again with the same unique message identifier. This will continue until a successful response is received from the storage node. If there is a failure of the network, for example due to the physical dropping of the connection or due to congestion on the network, then the same item will be sent again with the same unique message identifier once the network is working again. Use of the unique message identifier ensures that if duplicate messages are received at the storage node then they are only committed to storage once. An example where this can occur is if the processing node has sent a message a second time due to the lack of a successful response from the storage node to the original message but where the original message did actually get received by the storage node.

The item is finally removed from the FIFO queue once a successful response has been received from the storage node as shown in step 224, and the loop is allowed to continue with the sending, confirming, and removing of each subsequent item from the FIFO queue (step 226).

The use of the FIFO queue enables the continued recording of items even when the communication network between the processing node and the storage node fails. The FIFO queue holds the items in a first in and first out order ensuring the integrity of the order events were originally carried out is maintained. Once the network is recovered, all of the items in the FIFO queue can be retrieved in this original order.

In a preferred embodiment of the invention, two or more folder inserter machines operate across two or more sites and all are connected to the same multi node integrity system. Each site will have at least one folder inserter and this folder inserter will have a node. This node can also be shared across multiple folder inserters when all of the folder inserters are running the same job. When the first mailpiece of a job is detected in a folder inserter, the folder inserter's node will make a connection to the integrity system to determine whether the job is known and whether it is allowed to be run. If the job is known and allowed to be run, then the node will attempt to check the job out for its use. The result of this request can be success or it can result in the node being informed that another node has already checked the Job out for its use. In this second case, the node will redirect further requests to the primary node that has successfully checked out the job.

The action of successfully checked out a job for a node's use will result in important runtime information about the job and its mailpieces being downloaded to the node. Once they have been downloaded, all actions concerning that job must be directed through that node until the job has been checked back in to the storage node.

Mailpieces will continue to progress through the folder inserter with the actions of entering and leaving the folder inserter being recorded as important runtime information in real-time on the local processing node and being queued for transmission to the storage node as and when a connection is available. Once the initial checking out of a job has been completed, the folder inserter local to the processing node that has checked out the job will continue to be able to operate at full speed without any regard to the network between the nodes as there will be no reliance on the existence or speed of a network between the nodes until the job needs to be either reprinted or closed. Integrity will be maintained using controlling logic that is held within the local processing node. However, the existence of a network between nodes will provide an advantage at times when it is available in that it will allow for centralized dashboards to be updated and for the storage node to provide a backup of data. The existence of a network will also allow for the same job to be run across multiple sites at the same time.

Figure 4:
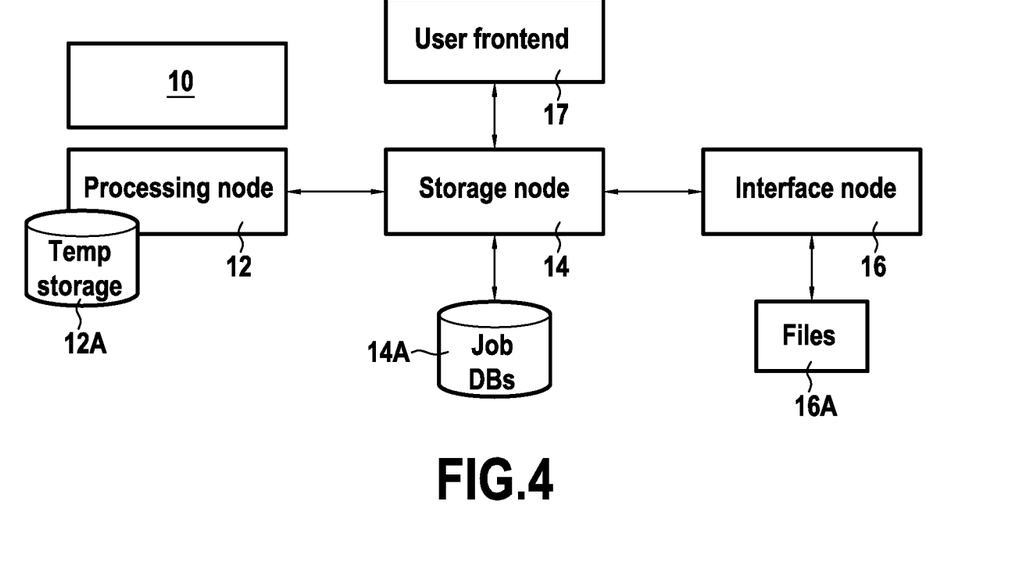
FIG. 4 is a high level diagram of the mail production system according to an embodiment the invention.

A high level diagram of a first embodiment of the invention is shown on FIG. 4 with in particular a processing node 12, a storage node 14 and an interface node 16. The storage node is connected to a user frontend 17. The processing node comprises at least a temporary memory 12A and the storage node a Job database 14A. The interface node allows the importing and exporting of files 16A, more particularly importing of JAF (Job Allocation File) files related to individual mailpieces that are intended to be processed through a folder inserter and exporting of JRF (Job Reprint File) and JCF (Job Closed File) files. When jobs are imported from JAF files they are sent to the storage node to be stored in permanent storage in the Job database 14A. The user frontend connects and receives data from the storage node. However actions carried out on a job by a user need to be confirmed manually by the user before they are then applied to the job's primary processing node. The job's primary processing node then updates the storage node in deferred time. Typical actions may include "Hand Mail/Void Requests", "Late Divert Requests", "Reprint Requests", "Job Close Requests", and "Job Reset Requests". Sending these actions via the processing node ensures actions were carried out in the correct order and that actions such as "Reprint Requests" and "Job Close Requests" were executed once all prior messages had been completed.

Implementation of this structure enables a closed loop system to work just as well in the same room or across the globe. In some implementations of this structure, all of the nodes are on the same computer. In other implementations, the nodes are split onto different computers. For example the processing node can run on a shared computer together with the storage node and interface node, or the processing node can run local to the machine on the machine's controller computer, with the storage node running on a second computer and the interface node running on a third computer.

Nodes can work out whether they are on the same computer or different computer to the node that they need to communicate with and, based on this, can determine the correct way of communicating with the other nodes. For example, if the processing node and storage node are on the same computer, then they can use a local protocol, whereas if they are not, they can use TCP/IP protocol to communicate. This method ensures the most efficient communication is always used. More particularly, a processing node is able to effectively "checkout" a job for its exclusive use. While the job is checked out to the processing node, all transactions regarding the job, and mailpieces within the job, need to go through this processing node.

The processing node maintains a list of the checked out job's mailpieces consisting of mailpiece identifiers, their machine finishing instructions (if required, for example in lookup mode), and their current dispositions. Other information, such as recipient address, does not need to be known by the processing node, although the system can be expanded to cater for this if necessary. Business logic with decisions on how or whether to process a mailpiece are held and applied on the processing node. An example of this business logic consists in rules on what to do with duplicate mailpieces.

The list held by the processing node is initially populated by communicating with the storage node and receiving the latest data from the permanent storage. Subsequent transactions carried out on the mailpieces within the checked out job make changes to the list on the processing node. The list is held in memory on the processing node however each transaction is also written to a log that will be removed once the job is successfully checked back in. This log allows for recovery from a local software crash of the processing node.

When each transaction modifies the processing node's list it also adds the transaction to a queue. This queue is regularly queried to determine if there are any transactions waiting on the queue. If there are transactions waiting on the queue then these are sent to the storage node for permanent storage. Each transaction has its own transaction identifier and must complete the round trip from the processing node to the storage node, into permanent storage, and back again before the next transaction is allowed to be sent. If a transaction is lost, for example due to a software crash or network fault, it will be sent again at regular intervals until the roundtrip is successfully completed. If this resending of transactions causes the same transaction to get to the storage node more than once, only the first transaction with the same transaction identifier will be written to permanent storage. Subsequent transactions with the same transaction identifier will be sent back to complete the roundtrip and inform the processing node that this transaction does not need to be sent again and that the next transaction can now be sent. This process ensures that all transactions will recover from momentary loss of nodes or communication network and will eventually complete the roundtrip as the loss of a transaction at any point will result in the transaction being resent as soon as the nodes and communication network are back in place.

If a job that was not known about is requested on a processing node, the processing node would request to "check out" the job from the storage node. If the job was already checked out, then the processing node would be informed of the other processing node that has this Job checked out. The processing node then relays transactions for this job to the correct processing node.

If a job is not checked out to a processing node, then the processing node requests the job be checked out from a storage node to itself and the processing node making this request will become that job's primary processing node.

A processing node can accept one or more machines connected to it simultaneously. A processing node can also exist with no machine connected to it in circumstances where manual work is being carried out.

Once a job is not needed on the processing node, the local logs regarding the job can be deleted and the job taken out of the processing node's memory. This is to be possible if there were no connected machines, no manual work being carried out, and all transactions have successfully completed the roundtrip to the storage node and the permanent storage.

Figure 5:
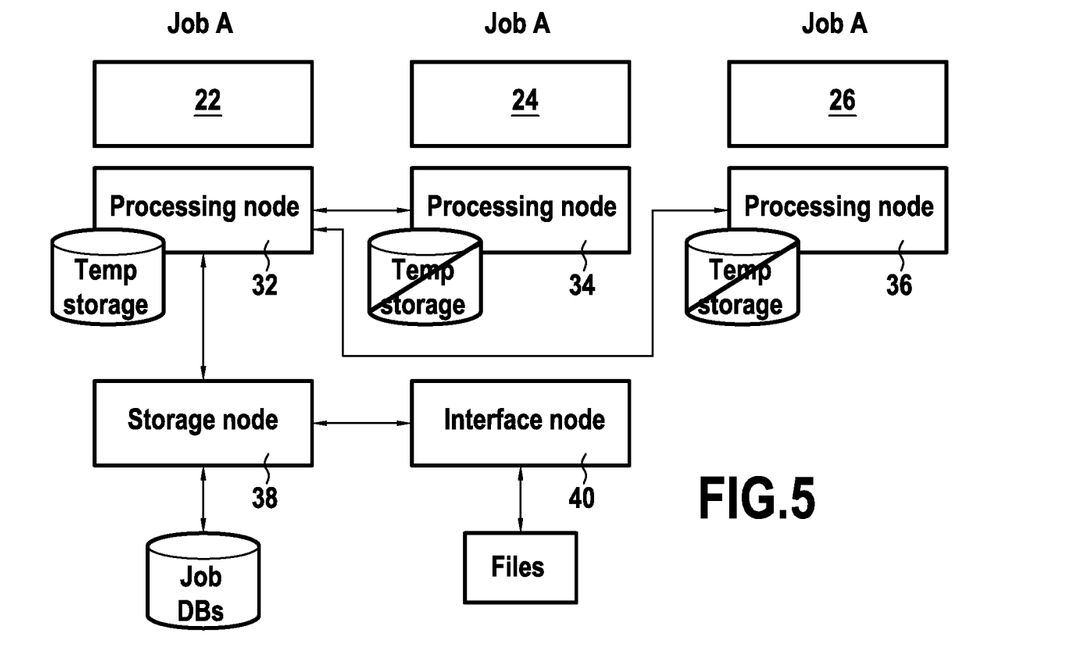
FIG. 5 and FIG. 6 illustrate two diagrams showing two distinct configurations of three machines processing a single job.
Figure 6:
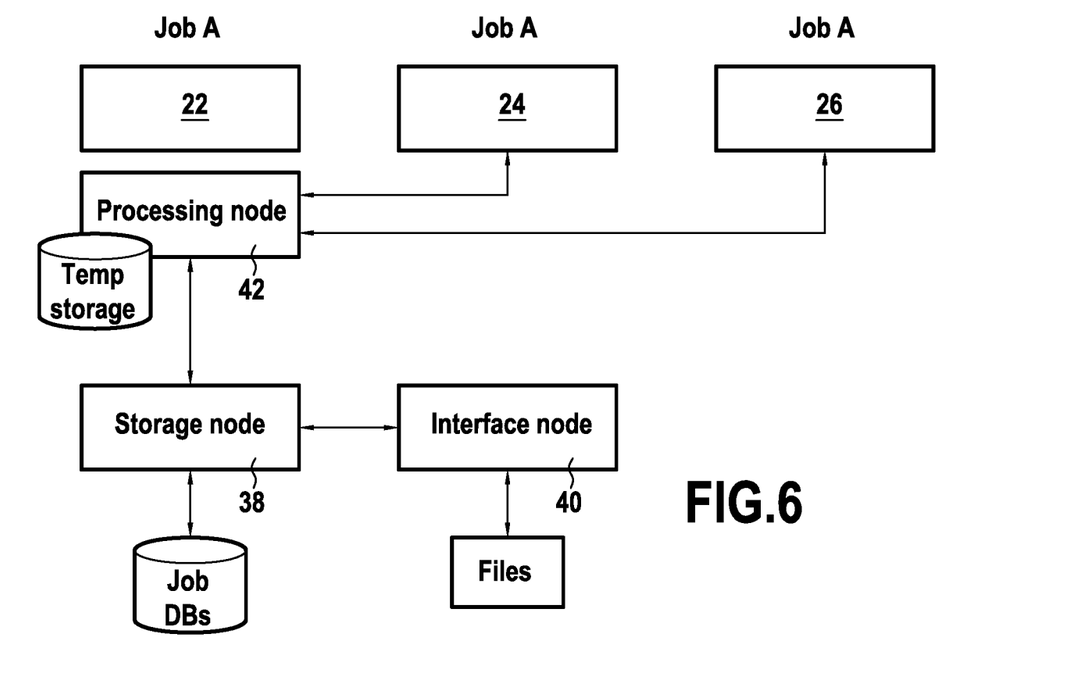

The two diagrams of FIG. 5 and FIG. 6 show three machines 22, 24, 26 connecting to a single job A. In the first diagram, processing nodes 32, 34, 36 are held on each machine and two of the machines 24, 26 relay transactions to the job's primary processing node 32 on the first machine (consequently no memory is necessary at these nodes). The first machine is the first to request that job A be checked out to its processing node 32. As previously, a storage node 38 is connected together to the primary processing node 32 and an interface node 40. In the second diagram, there is a shared local processing node 42 held on a separate computer. All three machines 22, 24, 26 connect to the same shared processing node 42 also connected to the storage node 38, which is connected to the interface node 40.

Using this model, a machine can connect to a local processing node in real-time even though the full job data is held on a storage node 38, potentially at great distance from the machine and with potential time lag issues. Additional co-located machines can also connect to the same local processing node 32, 42 in real-time.

Figure 7:
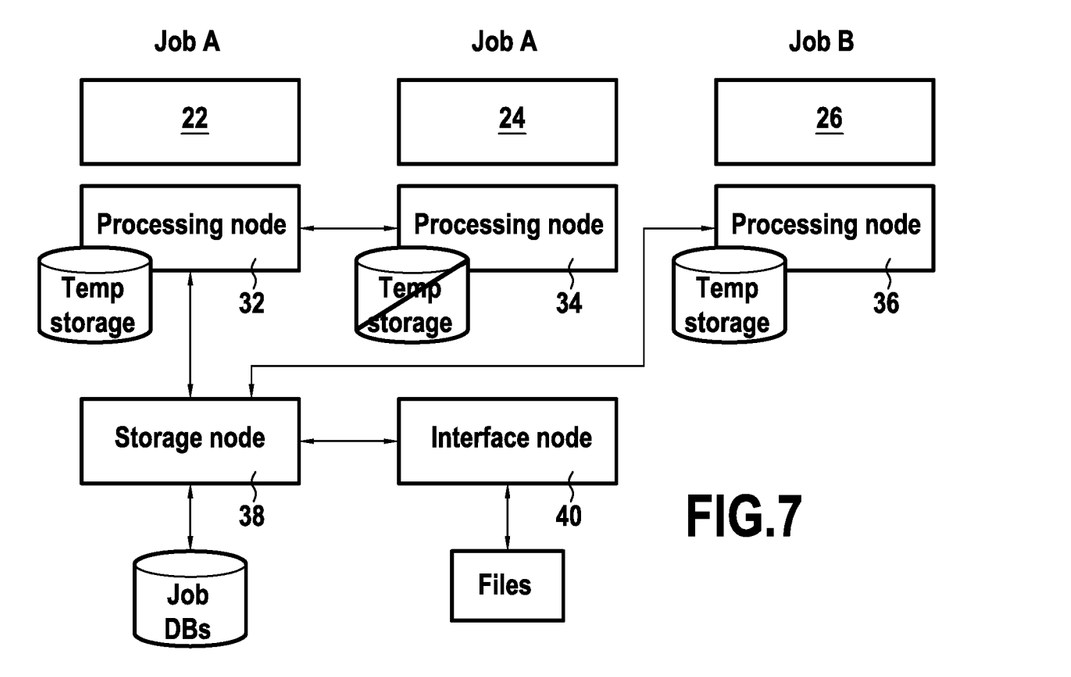
FIG. 7 and FIG. 8 are two diagrams showing two distinct configurations of three machines processing two different jobs.
Figure 8:
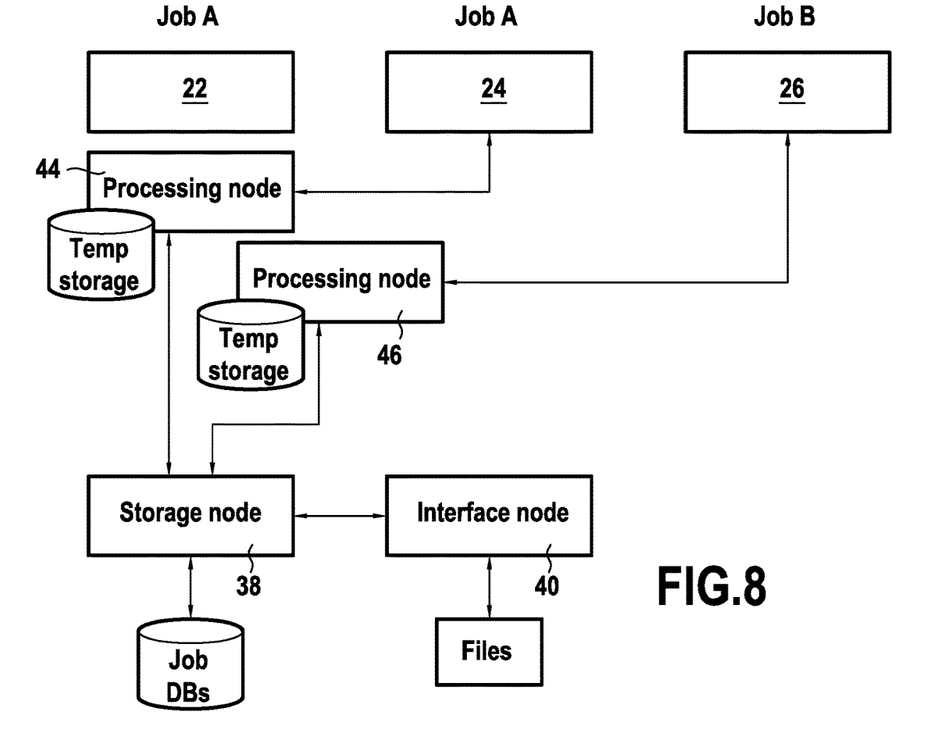

The two diagrams of FIG. 7 and FIG. 8 show job A running on the first two machines 22, 24 and job B running on the third machine 26. In the first diagram, processing nodes 32, 34, 36 are held on each machine. The first machine 22 originally checks out job A and the third machine 26 originally checked out job B. They each have their own primary job processing nodes 32, 36. The second machine 24 is also running job A and so relays its transactions to the primary processing node 32 of job A held on the first machine 24 (and as a consequence this second machine does not have a memory). In the second diagram, the processing nodes 44, 46 are held on a computer separate to the machine. The first machine 22 originally checks out job A and the third machine 26 originally checked out job B. They each have their own primary job processing nodes 44, 46 on the same computer that is separate to the machine. The second machine 24 is also running job A and so relays its transactions to the primary processing node 44 of job A held on the computer that is separate to the machine.

Figure 9A:
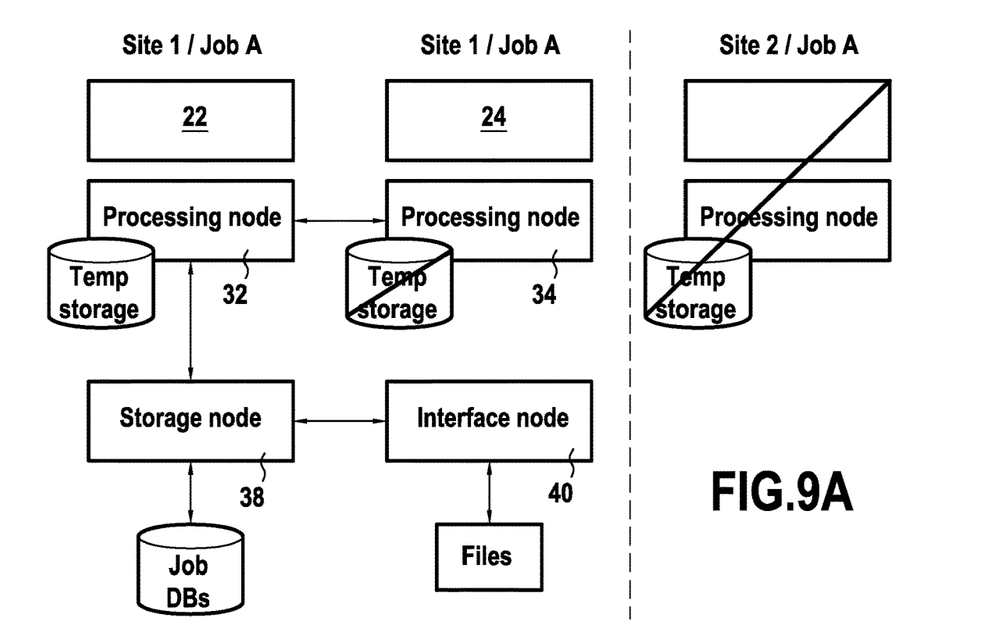
FIG. 9A and FIG. 9B are two diagrams showing a job processed successively at two different production sites.
Figure 9B:
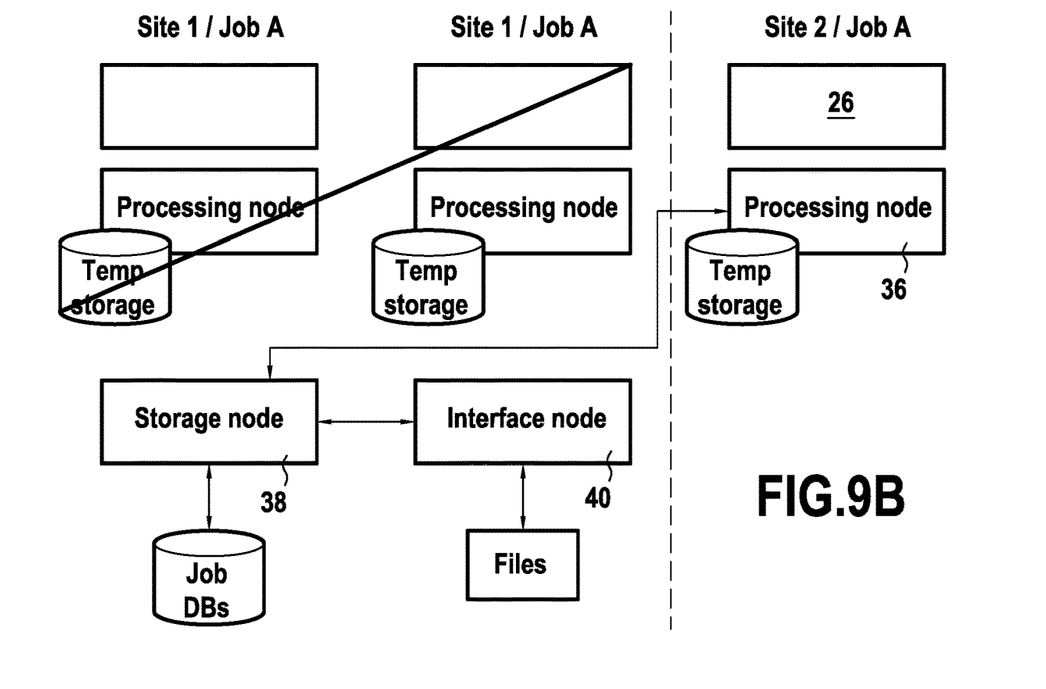

Should a job need to move from being processed at one location (referenced as site 1) to being processed at another location (referenced as site 2), all the customer needs to do is disconnect their machines at site 1, and then connect their machines at site 2. This causes the processing node local to site 1 to finish applying the job mailpiece changes to the storage node, check it back in, delete the local logs and remove the job from its memory. When the machines connect at site 2 the local processing node will find that no processing nodes at any location know about the job and will therefore request the job to be checked out to itself. Machines at site 2 will then connect locally to the local processing node running in real-time with no issues about distance. This is shown in the two diagrams of FIG. 9A and FIG. 9B which correspond to the successive operating phases: firstly, Job runs on site 1 then auto-ends and secondly Job is then picked up and runs on site 2.

Figure 10:
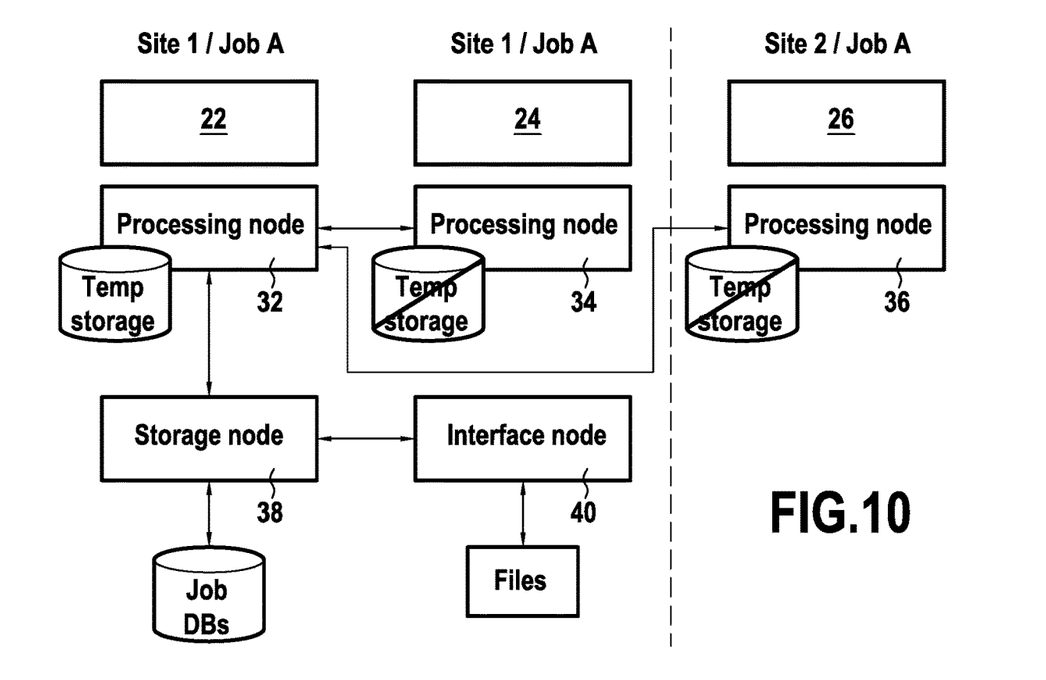
FIG. 10 relates to a diagram showing a job run simultaneously across two different production sites.

It is also possible to use this model to work across two locations site 1, site 2 simultaneously as illustrated on FIG. 10. Where this occurs, the machine connecting from the remote site 2 may discover issues with the communications network that result in the machine running slowly.

It must be noted that such an arrangement of a distributed multi-node mail production system also provides the following additional advantages:
the integrity of jobs can survive the breaking of a network connection; and
the mailpiece information placed on the FIFO queue can survive the switching off of the computer that it is held on and/or the breaking of the network connection.

The invention claimed is:
1. A system of handling of physical mailpieces and producing data files containing information about printed mailpieces belonging to a same job, the system comprising a plurality of folder inserters each having a reading device for extracting at least a job ID and a mailpiece ID from each of said printed mailpiece, wherein for processing said printed mailpieces through said plurality of folder inserters the system comprises at least:
a processing node, including computing hardware configured with data-processing and communications facilities, the processing node being connected, via at least one corresponding near-real-time connection, with at least one folder inserter of said plurality of folder inserters, wherein the processing node is adapted to control and monitor operation of the at least one folder inserter, including to check said job ID against job integrity rules and to check said mailpiece ID against mailpiece integrity rules, and to further check out a job corresponding to said job ID, wherein said job represents a plurality of mailpieces to be processed as a batch through the at least one folder inserter;
a storage node, including computing hardware configured with data-storage and communications facilities, the storage node is connected to said processing node and adapted to store data representing jobs and mailpieces corresponding to those jobs in permanent storage; and
an interface node, including computing hardware configured with file import/export facilities, the interface node is connected to said storage node and adapted to import and export said files;
wherein communications between the processing node and the storage and interface nodes are not necessarily carried out over near-real-time connections;
wherein the processing node is adapted to check out the job from the storage node for exclusive use by the processing node, wherein upon checking out the job the processing node receives runtime information about the job and the mailpieces associated with that job, and while the job is checked out to the processing node:
the processing node becomes a primary processing node for the job;
all transactions relating to the checked out job, and mailpieces within the job processed by any folder inserters of said plurality of folder inserters, are directed to be controlled and monitored by the primary processing node; and the processing node records a result of processing of each of the mailpieces of the checked out job in a memory of the processing node; and wherein the processing node is further adapted to check the job back in to the storage node after completion of processing of the mailpieces of the job, including sending the result of the processing of each of the mailpieces corresponding to that job to the storage node.

2. The system of claim 1 further comprising a user frontend connected to said storage node and adapted to receive data.

3. The system of claim 1, wherein said processing node, said storage node and said interface node are in a same computer.

4. The system of claim 1, wherein said processing node, said storage node and said interface node are split onto different computers.

5. The system of claim 3, wherein communications between said processing node, said storage node and said interface node use a local protocol.

6. The system of claim 4, wherein communications between said processing node, said storage node and said interface node use a network protocol.

7. The system of claim 1, wherein each folder inserter has a processing node and wherein the processing nodes of the folder inserters relay said job ID and mailpiece ID to the processing node that has checked out the job.

8. The system of claim 1, comprising a single processing node and wherein all folder inserters share said single processing node.

9. The system of claim 1, wherein the communications between said nodes are serialized within a message object having a transaction ID.

10. The system of claim 1, wherein the plurality of folder inserters is allocated to a plurality of production sites.

11. The system of claim 1, wherein the plurality of folder inserters is located at a first production site and the job is processed simultaneously by more than one of the plurality of folder inserters at the first production site.

12. The system of claim 1, wherein the plurality of folder inserters is located at least at a first production site and a second production site and the job is processed successively by at least one of the plurality of folder inserters at the first production site and at least one of the plurality of folder inserters at the second production site.

13. The system of claim 1, wherein the plurality of folder inserters is located at least at a first production site and a second production site and the job is processed simultaneously by at least one of the plurality of folder inserters at the first production site and at least one of the plurality of folder inserters at the second production site.

14. The system of claim 1, wherein the processing node is adapted to relay the job to another processing node if the job has already been checked out by said another processing node.

* * * * *